US012566691B2

(12) United States Patent
Savchenko et al.

(10) Patent No.: US 12,566,691 B2
(45) Date of Patent: Mar. 3, 2026

(54) SYSTEMS AND METHODS FOR TESTING APPLICATION RESILIENCY

(71) Applicant: Capital One Services, LLC, McLean, VA (US)

(72) Inventors: Yar Savchenko, Frisco, TX (US); Kyle Aaron Smith, Reston, VA (US)

(73) Assignee: CAPITAL ONE SERVICES, LLC, Mclean, VA (US)

( * ) Notice: Subject to any disclaimer, the term of this patent is extended or adjusted under 35 U.S.C. 154(b) by 122 days.

(21) Appl. No.: 18/298,320

(22) Filed: Apr. 10, 2023

(65) Prior Publication Data

US 2024/0338301 A1     Oct. 10, 2024

(51) Int. Cl.
| | |
|---|---|
| *G06F 11/00* | (2006.01) |
| *G06F 9/54* | (2006.01) |
| *G06F 11/3668* | (2025.01) |
| *G06F 11/3698* | (2025.01) |

(52) U.S. Cl.
CPC .......... G06F 11/3698 (2025.01); G06F 9/547 (2013.01); G06F 11/3692 (2013.01)

(58) Field of Classification Search
CPC ............. G06F 11/3664; G06F 11/3692; G06F 11/3457; G06F 9/547
See application file for complete search history.

(56) References Cited

U.S. PATENT DOCUMENTS

| | | | | |
|---|---|---|---|---|
| 8,275,855 | B2 * | 9/2012 | Kothari | ................... H04L 43/00 |
| | | | | 709/224 |
| 10,182,009 | B1 * | 1/2019 | Gupte | .................... H04L 67/34 |
| 10,810,110 | B1 * | 10/2020 | Thomas | .............. G06F 11/3664 |
| 10,901,880 | B1 * | 1/2021 | Bernard | .............. G06F 11/3476 |
| 2017/0242784 | A1 * | 8/2017 | Heorhiadi | ........... G06F 11/3684 |
| 2018/0039570 | A1 * | 2/2018 | Rajagopalan | ....... G06F 11/3636 |
| 2020/0296017 | A1 | 9/2020 | Mazzitelli | |
| 2020/0364127 | A1 * | 11/2020 | White | ................... H04L 43/091 |
| 2020/0366573 | A1 * | 11/2020 | White | ................. G06F 9/45558 |
| 2022/0100599 | A1 * | 3/2022 | Abuelela | ............. H04L 41/5019 |
| 2022/0414187 | A1 * | 12/2022 | Seck | .................. G06F 11/3093 |

OTHER PUBLICATIONS

European Search report mailed Sep. 16, 2024 for Application No. 24168557.7.

* cited by examiner

*Primary Examiner* — Elmira Mehrmanesh
(74) *Attorney, Agent, or Firm* — TROUTMAN PEPPER LOCKE LLP; Christopher J. Forstner; John A. Morrissett

(57) ABSTRACT

Disclosed embodiments may include a system for testing application resiliency. The system may receive first data associated with a plurality of microservices within a microservice architecture. The system may generate a graphical user interface (GUI) configured to display the first data and an icon associated with each of the plurality of microservices. The system may receive, via the GUI, a selection of the icon associated with a first microservice of the plurality of microservices. The system may transmit a call via an Application Programming Interface (API), from the first microservice to further microservice(s) of the plurality of microservices. The system may receive, via the GUI, a request to transmit a simulated Hypertext Transfer Protocol (HTTP) error response code from the further microservice(s) to the first microservice, transmit the simulated HTTP error response code from the further microservice(s) to the first microservice, and monitor a response from the first microservice.

20 Claims, 3 Drawing Sheets

FIG. 1

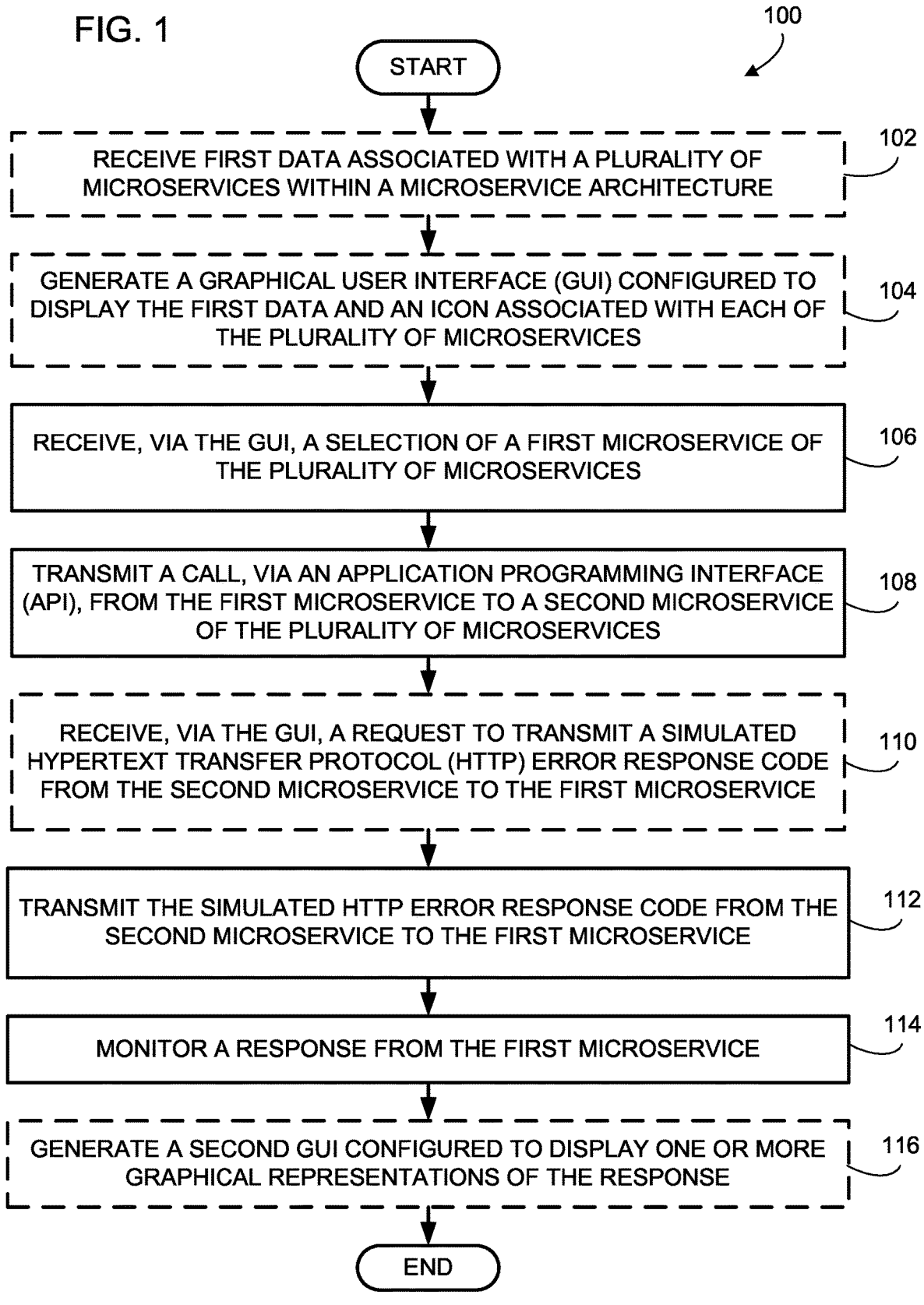

START

100

102 — RECEIVE FIRST DATA ASSOCIATED WITH A PLURALITY OF MICROSERVICES WITHIN A MICROSERVICE ARCHITECTURE

104 — GENERATE A GRAPHICAL USER INTERFACE (GUI) CONFIGURED TO DISPLAY THE FIRST DATA AND AN ICON ASSOCIATED WITH EACH OF THE PLURALITY OF MICROSERVICES

106 — RECEIVE, VIA THE GUI, A SELECTION OF A FIRST MICROSERVICE OF THE PLURALITY OF MICROSERVICES

108 — TRANSMIT A CALL, VIA AN APPLICATION PROGRAMMING INTERFACE (API), FROM THE FIRST MICROSERVICE TO A SECOND MICROSERVICE OF THE PLURALITY OF MICROSERVICES

110 — RECEIVE, VIA THE GUI, A REQUEST TO TRANSMIT A SIMULATED HYPERTEXT TRANSFER PROTOCOL (HTTP) ERROR RESPONSE CODE FROM THE SECOND MICROSERVICE TO THE FIRST MICROSERVICE

112 — TRANSMIT THE SIMULATED HTTP ERROR RESPONSE CODE FROM THE SECOND MICROSERVICE TO THE FIRST MICROSERVICE

114 — MONITOR A RESPONSE FROM THE FIRST MICROSERVICE

116 — GENERATE A SECOND GUI CONFIGURED TO DISPLAY ONE OR MORE GRAPHICAL REPRESENTATIONS OF THE RESPONSE

END

SYSTEMS AND METHODS FOR TESTING APPLICATION RESILIENCY

FIELD

The disclosed technology relates to systems and methods for testing application resiliency, and more particularly, for monitoring how applications respond to specific Hypertext Transfer Protocol (HTTP) error response codes.

BACKGROUND

Traditional systems and methods for testing application resiliency, or conducting chaos testing, typically involve the intentional breaking of one or more system components, such as by shutting down or terminating an instance. This typical type of testing then involves monitoring other components within the same system to detect how these other components handle the breakdown.

Accordingly, there is a need for improved systems and methods for testing application resiliency. Embodiments of the present disclosure are directed to this and other considerations.

SUMMARY

Disclosed embodiments may include a system for testing application resiliency. The system may include one or more processors, and memory in communication with the one or more processors and storing first instructions that are configured to cause the system to perform a method for testing application resiliency. The system may receive first data associated with a plurality of microservices within a microservice architecture. The system may generate a graphical user interface (GUI) configured to display the first data and an icon associated with each of the plurality of microservices. The system may receive, via the GUI, a selection of the icon associated with a first microservice of the plurality of microservices. Responsive to receiving the selection, the system may transmit a call, via an Application Programming Interface (API), from the first microservice to one or more further microservices of the plurality of microservices. The system may receive, via the GUI, a request to transmit a simulated Hypertext Transfer Protocol (HTTP) error response code from the one or more further microservices to the first microservice. Responsive to receiving the request, the system may transmit the simulated HTTP error response code from the one or more further microservices to the first microservice. The system may monitor a response from the first microservice.

Disclosed embodiments may include a system for testing application resiliency. The system may include one or more processors, and memory in communication with the one or more processors and storing first instructions that are configured to cause the system to perform a method for testing application resiliency. The system may receive, via a GUI, a selection of a first microservice of a plurality of microservices within a microservice architecture. Responsive to receiving the selection, transmit a call, via an API, from the first microservice to a second microservice of the plurality of microservices. The system may receive, via the GUI, a request to transmit a simulated HTTP error response code from the second microservice to the first microservice. Responsive to receiving the request, the system may transmit the simulated HTTP error response code from the second microservice to the first microservice. The system may monitor a response from the first microservice. The system may generate a second GUI configured to display one or more graphical representations of the response.

Disclosed embodiments may include a system for testing application resiliency. The system may include one or more processors, and memory in communication with the one or more processors and storing first instructions that are configured to cause the system to perform a method for testing application resiliency. The system may receive, via a first GUI, a selection of a first component of a plurality of components. The system may transmit a call, via an API, from the first component to a second component of the plurality of components. The system may transmit a simulated HTTP error response code from the second component to the first component. The system may monitor a response from the first microservice. Responsive to monitoring the response, the system may update the first microservice.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings:

FIG. 1 is a flow diagram illustrating an exemplary method for testing application resiliency, according to an example implementation of the disclosed technology.

DETAILED DESCRIPTION

Figure 2:
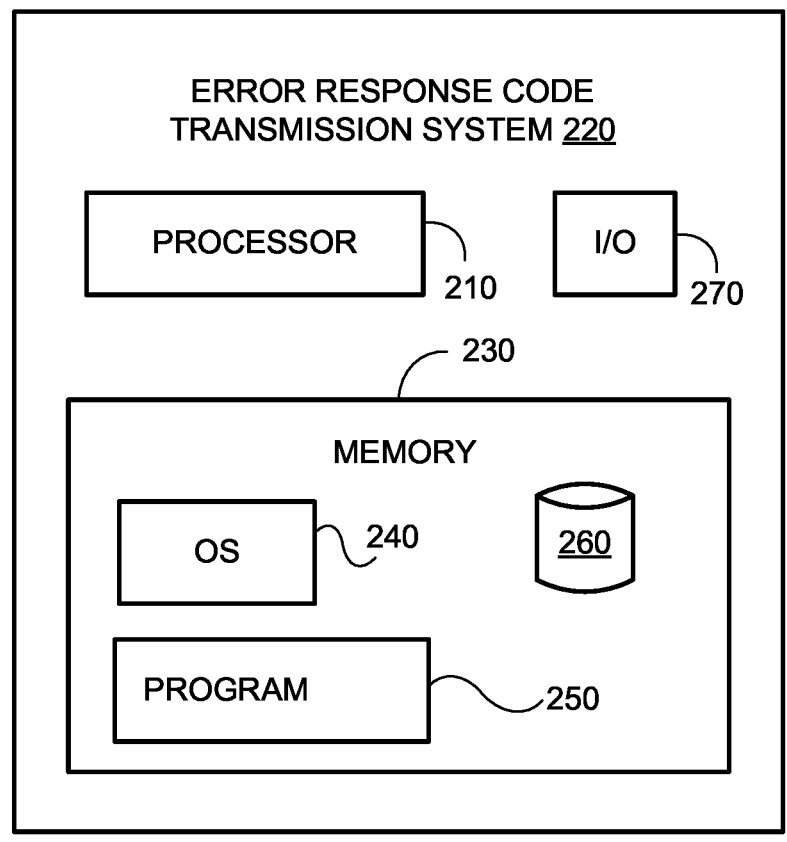
FIG. 2 is a block diagram of an example response code injection system used to test application resiliency, according to an example implementation of the disclosed technology.

Traditional systems and methods for testing application resiliency, or conducting chaos testing, typically involve the intentional breaking of one or more system components, such as by shutting down or terminating an instance. These systems and methods then typically involve monitoring other components within the same system to detect how these other components handle the breakdown. Users attempting to understand how these system breakdowns affect other components within a system architecture may find it challenging, however, to fully understand application resiliency as these systems and methods may not provide for the selection of specific error response codes to use in testing. Further, as these systems and methods typically require the actual breaking of one or more system components, this leads to system downtime that can impact end user operation of an overall system architecture.

Accordingly, examples of the present disclosure relate to systems and methods for testing application resiliency. In particular, the disclosed technology provides for receiving data associated with a plurality of microservices; generating a GUI to display the data; receiving, via the GUI, a selection of a first microservice of the plurality of microservices; transmitting an API call from the first microservice to a second microservice of the plurality of microservices; transmitting a simulated HTTP error response code from the second microservice to the first microservice; and monitoring a response from the first microservice.

The systems and methods described herein are thus necessarily rooted in computer and technology as they utilize, in some instances, graphical user interfaces (GUIs), which are a computer technology that allows for user interaction with computers through touch, pointing devices, or other means. Additionally, the systems and methods described herein improve, in some instances, the operation of computers and technology by transmitting simulated HTTP error response codes across microservices within a system architecture to dynamically monitor how individual microservices handle receiving those simulated error response codes. This testing methodology improves the overall operation of system architectures as system users may conduct specific system optimization based on the tested error response codes, and end users may not be impacted as the testing is conducted in a purely simulated fashion.

This may provide an advantage and improvement over prior technologies that may not provide a way to customize application resiliency testing by selecting specific HTTP error response codes to simulate. The present disclosure solves this problem by allowing for the selection of an HTTP error response code, and the simulated transmitting of the selected HTTP error response code from one microservice to another to monitor the resulting and actual response. Furthermore, examples of the present disclosure may also improve the speed with which computers can provide for application resiliency testing. Overall, the systems and methods disclosed have significant practical applications in the chaos engineering field because of the noteworthy improvements of the customized selection of error response codes and the simulated environment in which they are tested, which are important to solving present problems with this technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a flow diagram illustrating an exemplary method 100 for testing application resiliency, in accordance with certain embodiments of the disclosed technology. The steps of method 100 may be performed by one or more components of the system 300 (e.g., error response code transmission system 220 or web server 310 of application monitoring system 308, or user device 302), as described in more detail with respect to FIGS. 2 and 3. While certain blocks may be identified as being optional, certain embodiments may omit blocks even if they are not necessarily identified as being optional.

In optional block 102, error response code transmission system 220 may receive first data associated with a plurality of microservices within a microservice architecture. The first data may include any information associated with the functionality and/or operation of each microservice of the plurality of microservices. For example, a system user may be responsible for monitoring the operation of each microservice within a system architecture to ensure each microservice is operating efficiently and without error or downtime.

In optional block 104, error response code transmission system 220 may generate a GUI configured to display the first data and an icon associated with each of the plurality of microservices. For example, the GUI may be configured to display an icon representing each microservice, where each icon is placed within a diagram or flowchart to indicate proper direction of data flow or communication between each microservice within the system architecture. Each respective icon may also be labeled with specific data points, some that may dynamically change within the GUI based on real-time operation of each microservice. In some embodiments, the GUI may be configured such that a system user may click on a respective icon of a microservice within the GUI display to see additional data associated with the microservice, such as via a pop-up screen. In some embodiments, a system user may be able to take certain actions with respect to a microservice by clicking on the respective icon associated with that microservice, as further discussed below.

In block 106, error response code transmission system 220 may receive, via the GUI, a selection of a first microservice of the plurality of microservices. For example, as discussed above, a system user may click on a respective icon associated with the first microservice within the GUI display.

In block 108, responsive to receiving the selection, error response code transmission system 220 may transmit a call, via an API, from the first microservice to one or more second microservices of the plurality of microservices. The API call may comprise a request for the second microservice(s) to prove data and/or services to the first microservice.

In block 110, error response code transmission system 220 may receive, via the GUI, a request to transmit a simulated HTTP error response code from the second microservice(s) to the first microservice. In some embodiments, the simulated HTTP error response code may be, for example, a 1XX informational response (e.g., 101 Switching Protocols), a 2XX successful (e.g., 205 No Content), a 3XX redirection (e.g., 306 Switch Proxy), a 4XX client error (e.g., 404 Not Found), and/or a 5XX server error (e.g., 503 Service Unavailable). In some embodiments, the system user may click on the respective icon(s) associated with the second microservice(s), as discussed above, and may be presented, via the GUI, with a menu of options for taking certain actions with respect to the second microservice(s). These certain actions may include, for example, obtaining additional operation data associated with the second microservice(s), or transmitting a specific simulated HTTP error response code to the first microservice. A benefit of providing simulated HTTP error response codes is that a system user may be able to monitor how the first microservice responds to each simulated HTTP error response code without the need for the second microservice(s) to actually produce those HTTP error response codes, which could potentially cause downtime, errors, reduced efficiency, etc., to end users of the microservices.

In block 112, responsive to receiving the request, error response code transmission system 220 may transmit the simulated HTTP error response code to the first microservice. For example, the system may be configured to simulate the generation of the HTTP error response code with respect to the second microservice such that a system user may monitor how the first microservice responds to that selected simulated error response code, as further discussed herein.

In block 114, error response code transmission system 220 may monitor a response from the first microservice. As discussed herein, the response from the first microservice may indicate how the first microservice handles the simulated HTTP error response code from the second microservice(s). A benefit of this feature is that a system user may be able to monitor how the first microservice would handle a variety of different HTTP error response codes if the first microservice were to receive those error response codes in an actual, non-simulated environment.

In some embodiments, the system architecture being tested may be configured such that the first and second microservice(s) communicate directly with one another, or communicate via one or more Application Programming Interfaces (APIs). In some embodiments, the system architecture being tested may include one or more microservices and/or one or more APIs as individual components within the overall system.

In optional block 116, error response code transmission system 220 may generate a second GUI configured to display one or more graphical representations of the response. In some embodiments, the graphical representations may provide a system user with ways in which to analyze or evaluate how the first microservice responded to the simulated HTTP error response code generated by the second microservice(s). For example, the graphical representation(s) may indicate steady state operation information associated with the first microservice, such as by depicting a range of time during which operation of the first microservice remained steady. As another example, the graphical representation(s) may indicate failure state operation information associated with the first microservice, such as by depicting a time at which the first microservice experienced an error, downtime, or failure in relation to steady state operation. As another example, the graphical representation(s) may indicate a time at which the simulated HTTP error response code was transmitted to the first microservice. As another example, the graphical representation(s) may indicate a second time at which an alert arrived from the first microservice, such as in the form of a notification transmitted to a system user via the GUI (e.g., as an alert banner across the top of the GUI display), and/or via a personal device associated with a system user (e.g., a mobile device). In some embodiments, the alert may be in the form of a formatting change within the GUI. For example, should the first microservice experience an error, downtime, or some kind of failure in response to the second microservice(s) generating the simulated HTTP error response code, the system may be configured to modify the GUI such that the respective icon associated with the impacted first microservice changes, for example, by turning from green to red, or by changing from a first symbol type to a second symbol type (e.g., a check mark to an exclamation point), and the like.

In some embodiments, responsive to monitoring the response from the first microservice, error response code transmission system 220 may update the first microservice. In some embodiments, the system may be configured to determine one or more optimization strategies to apply to the first microservice. For example, the system may be configured to automatically make an adjustment to a load balancer associated with the first microservice, to transmit a notification to a system user (e.g., via a pop-up display in the GUI) providing a suggestion to adjust the load balancer, to record an error in a log, to respond with a specific error message to a system user, or to result in only partial success (e.g., loading only a portion of an expected page in the GUI).

Figure 3:
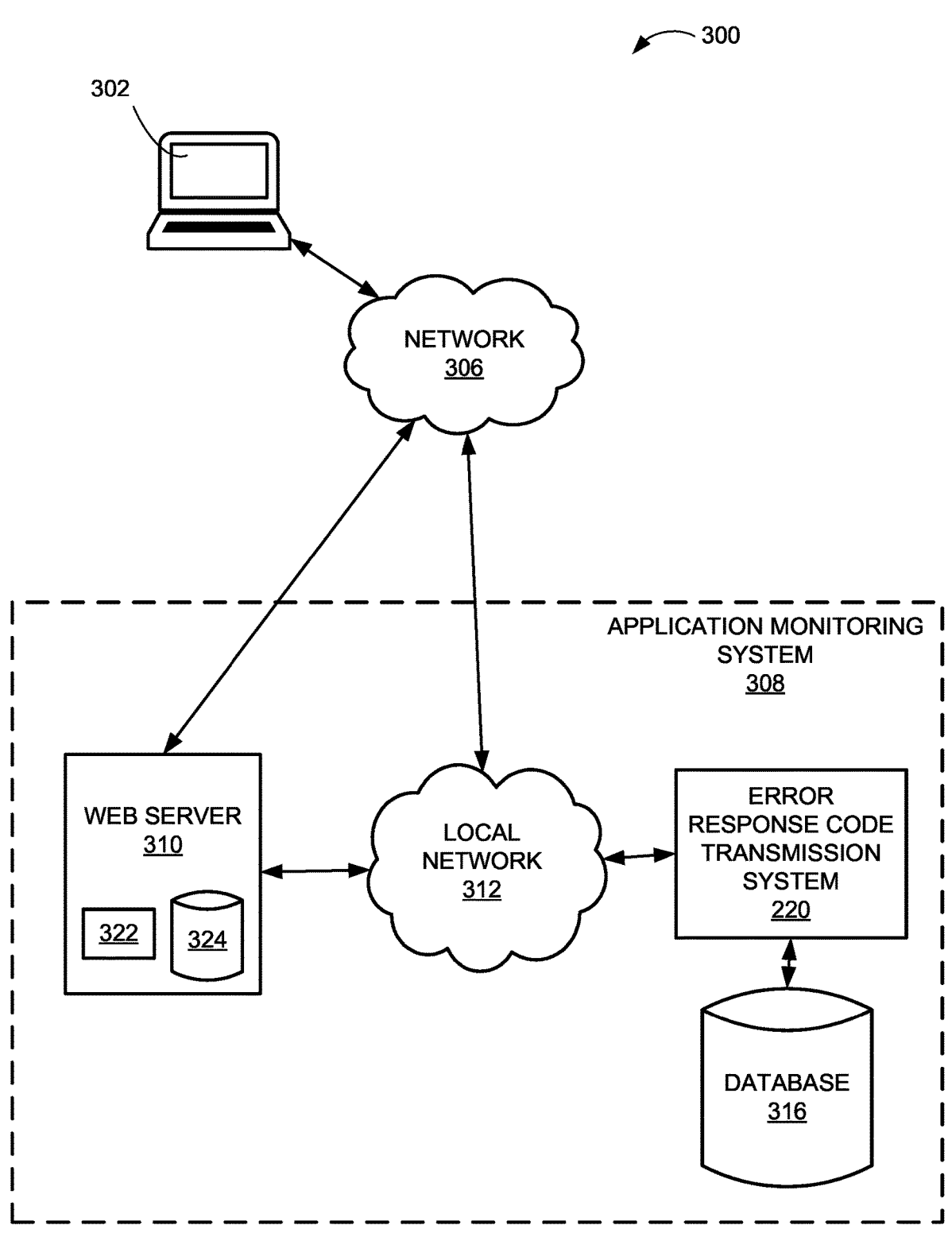
FIG. 3 is a block diagram of an example system used to test application resiliency, in accordance with certain embodiments of the disclosed technology.

FIG. 2 is a block diagram of an example error response code transmission system 220 used to test application resiliency, according to an example implementation of the disclosed technology. According to some embodiments, the user device 302 and web server 310, as depicted in FIG. 3 and described below, may have a similar structure and components that are similar to those described with respect to error response code transmission system 220 shown in FIG. 2. As shown, the error response code transmission system 220 may include a processor 210, an input/output (I/O) device 270, a memory 230 containing an operating system (OS) 240 and a program 250.

In certain example implementations, the error response code transmission system 220 may be a single server or may be configured as a distributed computer system including multiple servers or computers that interoperate to perform one or more of the processes and functionalities associated with the disclosed embodiments. In some embodiments error response code transmission system 220 may be one or more servers from a serverless or scaling server system. In some embodiments, the error response code transmission system 220 may further include a peripheral interface, a transceiver, a mobile network interface in communication with the processor 210, a bus configured to facilitate communication between the various components of the error response code transmission system 220, and a power source configured to power one or more components of the error response code transmission system 220.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), NFC, Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area network (WAN) or local area network (LAN). In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 230.

The processor 210 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 210 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 210 may be a single core processor that is configured with virtual processing technologies. In certain embodiments, the processor 210 may use logical processors to simultaneously execute and control multiple processes. The processor 210 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the error response code transmission system 220 may include one or more storage devices configured to store information used by the processor 210 (or other components) to perform certain functions related to the disclosed embodiments. In one example, the error response code transmission system 220 may include the memory 230 that includes instructions to enable the processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The error response code transmission system 220 may include a memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the error response code transmission system 220 may include the memory 230 that may include one or more programs 250 to perform one or more functions of the disclosed embodiments. For example, in some embodiments, the error response code transmission system

220 may additionally manage dialogue and/or other interactions with the customer via a program 250.

The processor 210 may execute one or more programs 250 located remotely from the error response code transmission system 220. For example, the error response code transmission system 220 may access one or more remote programs that, when executed, perform functions related to disclosed embodiments.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 230 may include software components that, when executed by the processor 210, perform one or more processes consistent with the disclosed embodiments. In some embodiments, the memory 230 may include a database 260 for storing related data to enable the error response code transmission system 220 to perform one or more of the processes and functionalities associated with the disclosed embodiments.

The database 260 may include stored data relating to status data (e.g., average session duration data, location data, idle time between sessions, and/or average idle time between sessions) and historical status data. According to some embodiments, the functions provided by the database 260 may also be provided by a database that is external to the error response code transmission system 220, such as the database 316 as shown in FIG. 3.

The error response code transmission system 220 may also be communicatively connected to one or more memory devices (e.g., databases) locally or through a network. The remote memory devices may be configured to store information and may be accessed and/or managed by the error response code transmission system 220. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The error response code transmission system 220 may also include one or more I/O devices 270 that may comprise one or more interfaces for receiving signals or input from devices and providing signals or output to one or more devices that allow data to be received and/or transmitted by the error response code transmission system 220. For example, the error response code transmission system 220 may include interface components, which may provide interfaces to one or more input devices, such as one or more keyboards, mouse devices, touch screens, track pads, trackballs, scroll wheels, digital cameras, microphones, sensors, and the like, that enable the error response code transmission system 220 to receive data from a user (such as, for example, via the user device 302).

In examples of the disclosed technology, the error response code transmission system 220 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The error response code transmission system 220 may be configured to classify a dataset. Classifying a dataset may include determining whether a dataset is related to another dataset. Classifying a dataset may include clustering datasets and generating information indicating whether a dataset belongs to a cluster of datasets. In some embodiments, classifying a dataset may include generating data describing the dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. Edge data may indicate a similarity between datasets and/or a hierarchical relationship (e.g., a data lineage, a parent-child relationship). In some embodiments, classifying a dataset may include generating graphical data, such as a node diagram, a tree diagram, or a vector diagram of datasets. Classifying a dataset may include estimating a likelihood that a dataset relates to another dataset, the likelihood being based on the similarity metric.

While the error response code transmission system 220 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the error response code transmission system 220 may include a greater or lesser number of components than those illustrated.

FIG. 3 is a block diagram of an example system that may be used to test application resiliency, according to an example implementation of the disclosed technology. The components and arrangements shown in FIG. 3 are not intended to limit the disclosed embodiments as the components used to implement the disclosed processes and features may vary. As shown, application monitoring system 308 may interact with a user device 302 via a network 306. In certain example implementations, the application monitoring system 308 may include a local network 312, an error response code transmission system 220, a web server 310, and a database 316.

In some embodiments, a user may operate the user device 302. User device 302 can include one or more of a mobile device, smart phone, general purpose computer, tablet computer, laptop computer, telephone, PSTN landline, smart wearable device, voice command device, other mobile computing device, or any other device capable of communicating with network 306 and ultimately communicating with one or more components of the application monitoring system 308. In some embodiments, user device 302 may include or incorporate electronic communication devices for hearing or vision impaired users.

Users may include individuals such as, for example, subscribers, clients, prospective clients, or customers of an entity associated with an organization, such as individuals who have obtained, will obtain, or may obtain a product, service, or consultation from or conduct a transaction in relation to an entity associated with the application monitoring system 308. According to some embodiments, user device 302 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The application monitoring system 308 may include programs (scripts, functions, algorithms) to configure data for visualizations and provide visualizations of datasets and data models on the user device 302. This may include programs to generate graphs and display graphs. The application monitoring system 308 may include programs to generate histograms, scatter plots, time series, or the like on the user device 302. The application monitoring system 308 may also be configured to display properties of data models and data model training results including, for example, architecture, loss functions, cross entropy, activation function values, embedding layer structure and/or outputs, convolution results, node outputs, or the like on the user device 302.

Network 306 may be of any suitable type, including individual connections via the internet such as cellular or WiFi networks. In some embodiments, network 306 may connect terminals, services, and mobile devices using direct connections such as RFID, NFC, Bluetooth™, low-energy BLE, WiFi™, ZigBee™, ABC protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 306 may include any type of computer networking arrangement used to exchange data. For example, network 306 may be the Internet, a private data network, virtual private network using a public network, and/or other suitable connection(s) that enable(s) components in the system 300 environment to send and receive information between the components of system 100. Network 306 may also include a public switched telephone network ("PSTN") and/or a wireless network.

Application monitoring system 308 may be associated with and optionally controlled by one or more entities such as a business, corporation, individual, partnership, or any other entity that provides one or more of goods, services, and consultations to individuals such as customers. In some embodiments, application monitoring system 308 may be controlled by a third party on behalf of another business, corporation, individual, partnership, etc. Application monitoring system 308 may include one or more servers and computer systems for performing one or more functions associated with products and/or services that the organization provides.

Web server 310 may include a computer system configured to generate and provide one or more websites accessible to customers, as well as any other individuals involved in access system 300's normal operations. Web server 310 may include a computer system configured to receive communications from user device 302 via for example, a mobile application, a chat program, an instant messaging program, a voice-to-text program, an SMS message, email, or any other type or format of written or electronic communication. Web server 310 may have one or more processors 322 and one or more web server databases 324, which may be any suitable repository of website data. Information stored in web server 310 may be accessed (e.g., retrieved, updated, and added to) via local network 312 and/or network 306 by one or more devices or systems (e.g., error response code transmission system 220) of system 300. In some embodiments, web server 310 may host websites or applications that may be accessed by user device 302. For example, web server 310 may host a financial service provider website that a user device may access by providing an attempted login that is authenticated by application monitoring system 308. According to some embodiments, web server 310 may include software tools, similar to those described with respect to user device 302, that may allow web server 310 to obtain network identification data from user device 302.

Local network 312 may include any type of computer networking arrangement used to exchange data in a localized area, such as WiFi, Bluetooth™ Ethernet, and other suitable network connections that enable components of application monitoring system 308 to interact with one another and to connect to network 306 for interacting with components in the system 300 environment. In some embodiments, local network 312 may include an interface for communicating with or linking to network 306. In other embodiments, certain components of application monitoring system 308 may communicate via network 306, without a separate local network 312.

The application monitoring system 308 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 302 may be able to access application monitoring system 308 using the cloud computing environment. User device 302 may be able to access application monitoring system 308 using specialized software. The cloud computing environment may eliminate the need to install specialized software on user device 302.

In accordance with certain example implementations of the disclosed technology, application monitoring system 308 may include one or more computer systems configured to compile data from a plurality of sources, for example, error response code transmission system 220, web server 310, and/or database 316. Application monitoring system 308 may correlate compiled data, analyze the compiled data, arrange the compiled data, generate derived data based on the compiled data, and store the compiled and derived data in a database such as database 316. According to some embodiments, database 316 may be a database associated with an organization and/or a related entity that stores a variety of information relating to customers, transactions, ATM, and business operations. Database 316 may also serve as a back-up storage device and may contain data and information that is also stored on, for example, database 260, as discussed with reference to FIG. 2.

Embodiments consistent with the present disclosure may include datasets. Datasets may comprise actual data reflecting real-world conditions, events, and/or measurements. However, in some embodiments, disclosed systems and methods may fully or partially involve synthetic data (e.g., anonymized actual data or fake data). Datasets may involve numeric data, text data, and/or image data. For example, datasets may include transaction data, financial data, demographic data, public data, government data, environmental data, traffic data, network data, transcripts of video data, genomic data, proteomic data, and/or other data. Datasets of the embodiments may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Datasets of disclosed embodiments may have a respective data schema (e.g., structure), including a data type, key-value pair, label, metadata, field, relationship, view, index, package, procedure, function, trigger, sequence, synonym, link, directory, queue, or the like. Datasets of the embodiments may contain foreign keys, for example, data elements that appear in multiple datasets and may be used to cross-reference data and determine relationships between datasets. Foreign keys may be unique (e.g., a personal identifier) or shared (e.g., a postal code). Datasets of the embodiments may be "clustered." for example, a group of datasets may share common features, such as overlapping data, shared statistical properties, or the like. Clustered datasets may share hierarchical relationships (e.g., data lineage).

EXAMPLE USE CASE

The following example use case describes an example of a typical user flow pattern. This section is intended solely for explanatory purposes and not in limitation.

In one example, a system user may open a GUI display on a computing device (e.g., a laptop) and log into a system account such that the system user may observe the operation of a microservice system architecture. The GUI display may show a diagram of each microservice within the architecture, and a flow of how and where each microservice communicates with and/or is related to other microservices within the architecture. The system user may utilize this display in a simulated mode to conduct an application resiliency test. First, the system user may click on or highlight an icon associated with a first microservice within the architecture. Next, the system may be configured to transmit an API call from the first microservice to a second microservice within the system architecture. The system user may then right click the icon associated with the second microservice to bring up a drop-down menu of different HTTP error response code options. The system user may flip through the options and select the 503 Service Unavailable error response code. Once the system user selects the 503 error response code, the system may be configured to conduct a simulation as to how the first microservice would handle receiving the 503 error response code from the second microservice. The system user may thus be able to evaluate, via the dynamically changing GUI, how the first microservice within the architecture might respond. For example, the system user may see that an icon associated with a first microservice in the GUI, after a certain period of time, changes from green to red. As another example, the system user may see an icon of an exclamation point appear next to the icon associated with the first microservice. The system may be configured such as to automatically adjust the first microservice to improve its operability in situations when the first microservice receives the 503 error response code from the second microservice. Alternatively, the system may be configured to transmit a notification to the system user, such as via a message attached to the exclamation point icon, providing the system user with instructions on how best to improve the operability of the first microservice, such as by modifying an associated load balancer.

In some examples, disclosed systems or methods may involve one or more of the following clauses:

Clause 1: A system comprising: one or more processors; and a memory in communication with the one or more processors and storing instructions that, when executed by the one or more processors, are configured to cause the system to: receive first data associated with a plurality of microservices within a microservice architecture; generate a graphical user interface (GUI) configured to display the first data and an icon associated with each of the plurality of microservices; receive, via the GUI, a selection of the icon associated with a first microservice of the plurality of microservices; responsive to receiving the selection, transmit a call, via an Application Programming Interface (API), from the first microservice to one or more further microservices of the plurality of microservices; receive, via the GUI, a request to transmit a simulated Hypertext Transfer Protocol (HTTP) error response code from the one or more further microservices to the first microservice; responsive to receiving the request, transmit the simulated HTTP error response code from the one or more further microservices to the first microservice; and monitor a response from the first microservice.

Clause 2: The system of clause 1, wherein the response from the first microservice is based on the simulated HTTP error response code.

Clause 3: The system of clause 1, wherein the first microservice communicates with each of the one or more further microservices either directly or via an API Gateway.

Clause 4: The system of clause 1, wherein the instructions are further configured to: generate a second GUI configured to display one or more graphical representations of the response.

Clause 5: The system of clause 4, wherein the one or more graphical representations are configured to indicate steady state operation information associated with the first microservice, failure state operation information associated with the first microservice, or both.

Clause 6: The system of clause 4, wherein the one or more graphical representations are configured to indicate a first time at which the simulated HTTP error response code was transmitted to the first microservice, a second time at which an alert arrived from the first microservice, or both.

Clause 7: The system of clause 1, wherein the instructions are further configured to: responsive to monitoring the response, update the first microservice.

Clause 8: A system comprising: one or more processors; and a memory in communication with the one or more processors and storing instructions that, when executed by the one or more processors, are configured to cause the system to: receive, via a first graphical user interface (GUI), a selection of a first microservice of a plurality of microservices within a microservice architecture; responsive to receiving the selection, transmit a call, via an Application Programming Interface (API), from the first microservice to a second microservice of the plurality of microservices; receive, via the GUI, a request to transmit a simulated Hypertext Transfer Protocol (HTTP) error response code from the second microservice to the first microservice; responsive to receiving the request, transmit the simulated HTTP error response code from the second microservice to the first microservice; monitor a response from the first microservice; and generate a second GUI configured to display one or more graphical representations of the response.

Clause 9: The system of clause 8, wherein the response from the first microservice is based on the simulated HTTP error response code.

Clause 10: The system of clause 8, wherein the first microservice communicates with the second microservice either directly or via an API Gateway.

Clause 11: The system of clause 8, wherein the one or more graphical representations are configured to indicate steady state operation information associated with the first microservice, failure state operation information associated with the first microservice, or both.

Clause 12: The system of clause 11, wherein the one or more graphical representations are further configured to indicate a first time at which the simulated HTTP error response code was transmitted to the first microservice, a second time at which an alert arrived from the first microservice, or both.

Clause 13: The system of clause 8, wherein the instructions are further configured to: responsive to monitoring the response, update the first microservice.

Clause 14: A system comprising: one or more processors; and a memory in communication with the one or more processors and storing instructions that, when executed by the one or more processors, are configured to cause the system to: receive, via a first graphical user interface (GUI), a selection of a first component of a plurality of components; transmit a call, via an Application Programming Interface (API), from the first component to a second component of the plurality of components; transmit a simulated Hypertext Transfer Protocol (HTTP) error response code from the second component to the first component; monitor a response from the first microservice; and responsive to monitoring the response, update the first microservice.

Clause 15: The system of clause 14, wherein each component of the plurality of components comprises a microservice or an API.

Clause 16: The system of clause 14, wherein the response from the first microservice is based on the simulated HTTP error response code.

Clause 17: The system of clause 14, wherein the first component communicates with the second component either directly or via an API Gateway.

Clause 18: The system of clause 14, wherein the instructions are further configured to: generate a second GUI configured to display one or more graphical representations of the response.

Clause 19: The system of clause 18, wherein the one or more graphical representations are configured to indicate steady state operation information associated with the first component, failure state operation information associated with the first component, or both.

Clause 20: The system of clause 18, wherein the one or more graphical representations are configured to indicate a first time at which the simulated HTTP error response code was transmitted to the first microservice, a second time at which an alert arrived from the first microservice, or both.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor." "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment." "an embodiment," "some embodiments," "example embodiment," "various embodiments," "one implementation," "an implementation," "example implementation," "various implementations." "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   one or more processors; and
   a memory in communication with the one or more processors and storing instructions that, when executed by the one or more processors, are configured to cause the system to:

receive first data associated with a plurality of microservices within a microservice architecture;

generate a graphical user interface (GUI) configured to display the first data and a plurality of icons, wherein each icon of the plurality of icons represents a respective microservice of the plurality of microservices;

receive, from a user device via the GUI, a selection by a user of an icon representing a first microservice of the plurality of microservices;

responsive to receiving the selection, transmit a call, via an Application Programming Interface (API), from the first microservice to one or more further microservices of the plurality of microservices;

cause the user device to display, via the GUI, selectable icons associated with the one or more further microservices of the plurality of microservices, wherein one or more of the selectable icons are operable to allow the user to cause a specific simulated Hypertext Transfer Protocol (HTTP) error response code to be sent to the first microservice from one of the further microservices of the plurality of microservices;

receive, from the user device via the GUI, a request to transmit a simulated HTTP error response code from the one or more further microservices to the first microservice based on a user selection of the specific simulated HTTP error response code from a menu of available HTTP error response codes via the GUI;

responsive to receiving the request, transmit the simulated HTTP error response code from the one or more further microservices to the first microservice; and monitor a response from the first microservice.

2. The system of claim 1, wherein the response from the first microservice is based on the simulated HTTP error response code.

3. The system of claim 1, wherein the first microservice communicates with each of the one or more further microservices either directly or via an API Gateway.

4. The system of claim 1, wherein the instructions are further configured to:
   generate a second GUI configured to display one or more graphical representations of the response.

5. The system of claim 4, wherein the one or more graphical representations are configured to indicate steady state operation information associated with the first microservice, failure state operation information associated with the first microservice, or both.

6. The system of claim 4, wherein the one or more graphical representations are configured to indicate a first time at which the simulated HTTP error response code was transmitted to the first microservice, a second time at which an alert arrived from the first microservice, or both.

7. The system of claim 1, wherein the instructions are further configured to:
   responsive to monitoring the response, update the first microservice.

8. The system of claim 1, wherein the simulated HTTP error response code is selected by the user and comprises one of a 1XX informational response, a 2XX successful, a 3XX redirection, a 4XX client error, and a 5XX server error.

9. The system of claim 1, wherein the instructions are further configured to:
   automatically adjust the first microservice to improve operability in situations when the first microservice receives the HTTP error response code from the one or more further microservices.

10. The system of claim 1, wherein the instructions are further configured to:

generate and transmit a notification to the user device, the notification comprising instructions for improving the operability of the first microservice.

11. The system of claim 1, wherein at least one selectable icon of the selectable icons associated with the one or more further microservices of the plurality of microservices comprises a dropdown menu listing different simulated HTTP error response code options to send to the first microservice.

12. A system comprising:

one or more processors; and a memory in communication with the one or more processors and storing instructions that, when executed by the one or more processors, are configured to cause the system to:

receive, from a user device via a first graphical user interface (GUI), a selection by a user of a first microservice of a plurality of microservices within a microservice architecture;

responsive to receiving the selection, transmit a call, via an Application Programming Interface (API), from the first microservice to a second microservice of the plurality of microservices;

cause the user device to display, via the GUI, selectable icons associated with the second microservice of the plurality of microservices, wherein one or more of the selectable icons are operable to allow the user to cause a specific simulated Hypertext Transfer Protocol (HTTP) error response code to be sent to the first microservice from the second microservice of the plurality of microservices;

receive, from the user device via the GUI, a request to transmit a simulated HTTP error response code from the second microservice to the first microservice based on a user selection of the specific simulated HTTP error response code from a menu of available HTTP error response codes via the GUI;

responsive to receiving the request, transmit the simulated HTTP error response code from the second microservice to the first microservice;

monitor a response from the first microservice; and generate a second GUI configured to display one or more graphical representations of the response.

13. The system of claim 12, wherein the response from the first microservice is based on the simulated HTTP error response code.

14. The system of claim 12, wherein the one or more graphical representations are configured to indicate steady state operation information associated with the first micro-service, failure state operation information associated with the first microservice, or both.

15. The system of claim 14, wherein the one or more graphical representations are further configured to indicate a first time at which the simulated HTTP error response code was transmitted to the first microservice, a second time at which an alert arrived from the first microservice, or both.

16. The system of claim 12, wherein the instructions are further configured to:

responsive to monitoring the response, update the first microservice.

17. The system of claim 12, wherein at least one selectable icon of the selectable icons associated with the second microservice of the plurality of microservices comprises a dropdown menu listing different simulated HTTP error response code options to send to the first microservice.

18. A system comprising:

one or more processors; and a memory in communication with the one or more processors and storing instructions that, when executed by the one or more processors, are configured to cause the system to:

receive, from a user device via a first graphical user interface (GUI), a selection by a user of a first component of a plurality of components;

transmit a call, via an Application Programming Interface (API), from the first component to a second component of the plurality of components;

cause the user device to display, via the GUI, selectable icons associated with the second component of the plurality of components, wherein one or more of the selectable icons are operable to allow the user to cause a specific simulated Hypertext Transfer Protocol (HTTP) error response code to be sent to the first component from the second component of the plurality of components;

transmit a simulated HTTP error response code from the second component to the first component based on a user selection of the specific simulated HTTP error response code from a menu of available HTTP error response codes via the GUI;

monitor a response from the first component; and responsive to monitoring the response, update the first component.

19. The system of claim 18, wherein each component of the plurality of components comprises a microservice or an API.

20. The system of claim 18, wherein the instructions are further configured to:

generate a second GUI configured to display one or more graphical representations of the response.

* * * * *